Feb. 24, 1942.  R. H. JANSSEN  2,274,485
COLOR MIXING DEVICE
Filed July 18, 1940  2 Sheets-Sheet 1

INVENTOR.
Richard H. Janssen
BY Wood & Wood ATTORNEYS

Feb. 24, 1942.   R. H. JANSSEN   2,274,485
COLOR MIXING DEVICE
Filed July 18, 1940   2 Sheets-Sheet 2

INVENTOR.
BY Richard H. Janssen
Wood & Wood ATTORNEYS

Patented Feb. 24, 1942

2,274,485

UNITED STATES PATENT OFFICE 2,274,485

COLOR MIXING DEVICE

Richard H. Janssen, Columbus, Ohio

Application July 18, 1940, Serial No. 346,189

2 Claims. (Cl. 259—99)

This invention relates to a device for incorporating coloring material into oleomargarine and other fat-like or plastic substances. The principal objective has been to provide a mechanical device adapted for use in the coloring of small batches of material and so simple that it readily may be used in the kitchen by a housewife.

At present, various State and Federal laws have been enacted imposing substantial taxes on the sale of margarine containing any coloring material tending to make it visibly similar to butter. For this reason, most manufacturers sell the uncolored product and supply a small package containing a major amount of coloring material in the carton with the margarine. The housewife purchasing the product incorporates the color in the margarine, usually by mixing the two together in a bowl by hand, or with a spoon.

The home mixing process is a tedious one, and, various mechanical mixers have been suggested to make the task somewhat easier, but these either require that the margarine be heated so as to make it more fluid, or else the devices have been so complex as to be unsuitable for use.

The heating of oleomargarine to make it easier to work disturbs the physical structure of the product and the material tends to become granular after it is subsequently cooled, or the components tend to separate from one another. On the other hand, so much time is required, for assembling and cleaning the complex mechanical devices which heretofore have been proposed for working chilled margarine, that the housewives prefer to employ the hand mixing procedure despite its disadvantages. In view of these considerations, the principal object of the present invention has been to provide a mechanical device, readily cleanable and readily arranged for usage, and so simple that it may be manufactured at low cost.

The device of the present invention briefly is comprised of a cylindrical chamber in which the margarine taken from a typical one-pound carton, or so called "print," may be deposited. Within this chamber a plow element is provided along a spiral track and a shaft is provided to rotate the plow element and therefore advance it into the plastic material; this movement causes the material to be subjected to a working pressure.

The plow is a bladed member and constitutes the primary member by which the coloring matter is admixed and distributed throughout the mass of margarine. It preferably is of a circular contour so as to fit within the cylinder and the blades of it are pitched and separated from one another so as to permit material to pass between them. However, the blades also contain apertures so that some of the material is forced through the blades to commingle with that passing intermediate the blades.

When the plow wheel is moved to the end of the track and reaches the end of the container the direction of rotation of the shaft is reversed and it is returned through the material for further admixing. After ten to fifteen passes, requiring about a half minute to a minute in time, the entire quantity of coloring material is distributed evenly and uniformly throughout the margarine and the mass is taken from the cylinder either in bulk form or extruded in the form of a print.

A typical embodiment of the invention is shown in the accompanying drawings. From the foregoing description of the principles of the invention and the description of a typical embodiment which follows, those skilled in the art readily will comprehend the various modifications and uses to which the invention is adapted.

Figure 1:
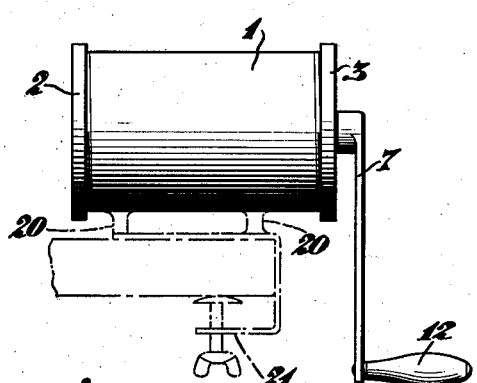
Figure 1 is a side elevation of the assembled device.
Figure 2:
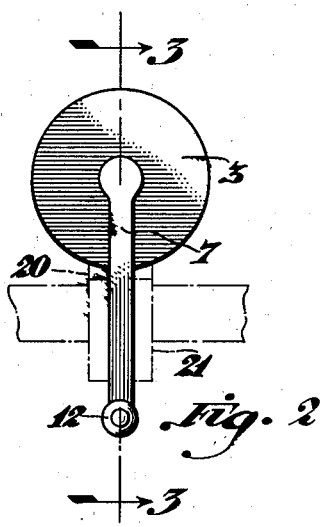
Figure 2 is an end elevation.
Figure 3:
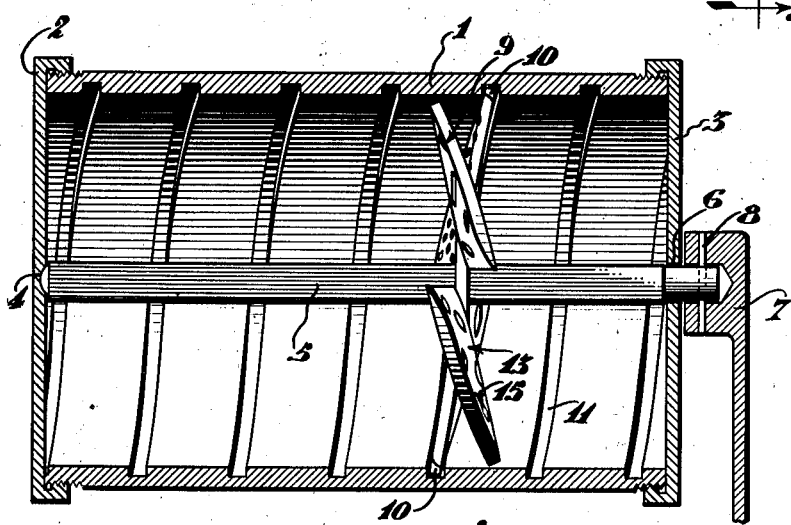
Figure 3 is a cross sectional elevation taken on the line 3—3 of Figure 2.

The device shown in the drawings is comprised of a cylindrical body 1 which is provided with end caps 2 and 3 respectively. This chamber may be made of metal, glass or plastic materials and is preferably of such size that a pound "print" can be deposited within it without substantial excess space, though it may be longer or smaller if desired.

The end plate 2 is provided with a central recess 4 on its interior surface which forms a seat or bearing for the one end of a drive shaft 5. The other cover 3 provides a journal 6 for the other end of the shaft, and the shaft extends beyond the cover plate to carry a crank 7; this preferably is pinned to the shaft as at 8. It is desirable that the cover plates be removably connected to the body portion either by means of screw threads or appropriate bayonet connections or the like, since the margarine exerts substantial pressure against the caps, as it is being worked.

The shaft 5, as shown in the drawings, is of rectangular cross section though it otherwise may be provided with splines so as to fit a complementary bore within the plow element. The latter member is rotated by the shaft and it is also free to move longitudinally of it.

The plow of the device is comprised of a bladed disc-like wheel, which is indicated generally at 9. This wheel is of such diameter that it fits snugly within the cylindrical body 1 and at the periphery of it tangs 10—10 are provided to be tracked, in a spiral groove 11 in the body 1 of the device. Instead of the groove and tang means for advancing the plow longitudinally of the container as the crank is rotated, other suitable track arrangements may be utilized. For instance, a spiral ridge or tortuous track may be provided to extend inwardly from the inner surface of the cylinder, and appropriate indentations cut in the periphery of the plow to fit the track. When the handle 12 of the crank 7 is grasped and the crank is rotated, the plow advances from one end of the cylinder to the other through the body of margarine deposited within the chamber.

The blades of the plow wheel are indicated generally at 13. For instance, as shown in the drawings, there are 4 in number, although there may be more or less. The blades are delineated by the radial slots indicated at 14, and are pitched so that each presents a leading edge adjacent each slot. As the plow wheel is driven into the body of material, portions of it are cut away and pass through the slots for subdivision of the material.

Figure 4:
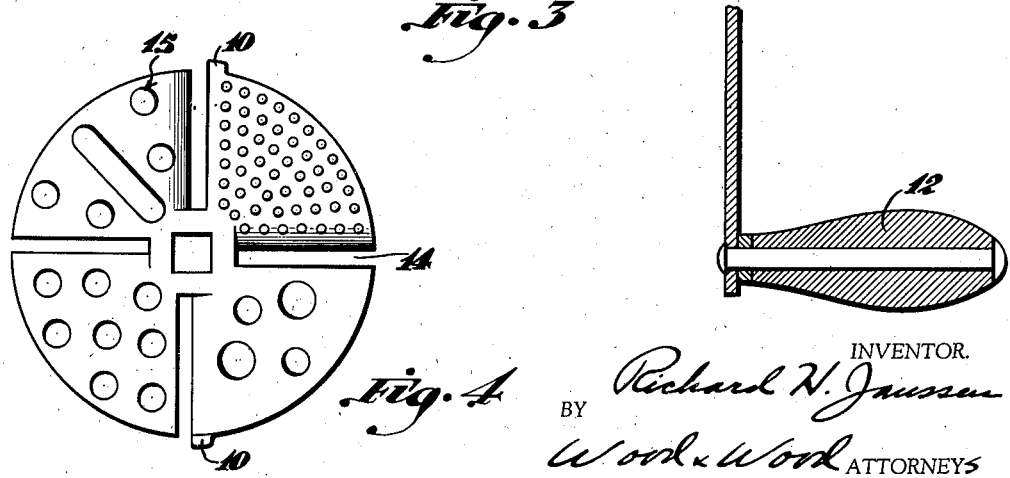
Figure 4 is a detailed view of a plow element.
Figure 8:
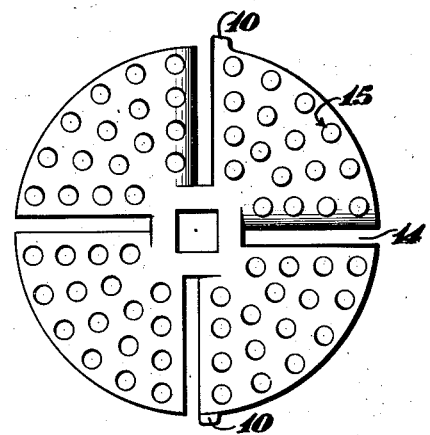
Figure 8 shows a modified type of plow element.

Each blade of the plow wheel also contains a plurality of apertures. These are indicated generally at 15. The apertures may be of uniform size and spacing as shown in Figure 8, or better still, may be of varying size as shown in Figure 4; the latter arrangement peculiarly provides a better homogenizing action than the former, in most cases. Plastic material passing through these openings in the blades of the wheel becomes commingled with the portions of material passing through the slots 14. Thus the local portions of margarine throughout the mass are rearranged and subdivided so that any material carrying color is brought into contact with material as yet uncolored.

Figure 5:
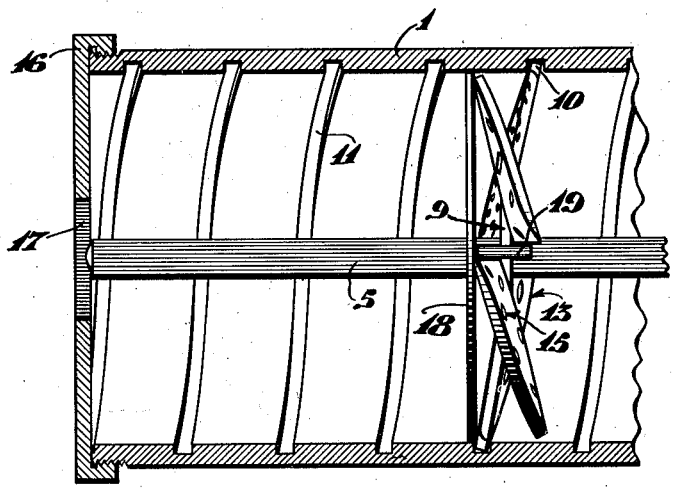
Figure 5 is a sectional view similar to Figure 3, showing means for expelling the mass of margarine after it has been colored.
Figure 6:
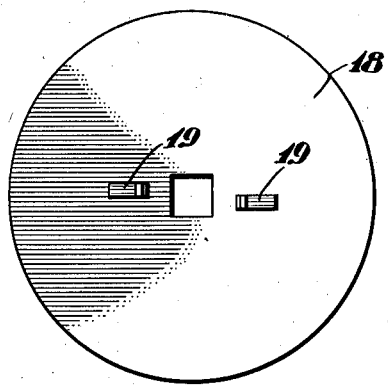
Figure 6 is a face view of the expeller elevation.
Figure 7:
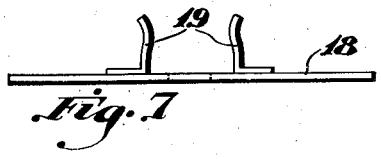
Figure 7 is a side view of the expeller.

Figures 5, 6 and 7 show apparatus adapted for the discharge of plastic material from the container after it has been colored. For this purpose the cap 2 is replaced by a cap 16 which contains a central rectangular aperture 17 of a desired size in cross section.

Presser plate 18 fits over the shaft 5 and is installed in front of the plow member so that it extends across the cylinder. Tangs or clips 19 are fastened to the rearward face of the presser plate 18 and fit within opposite grooves 14 of the plow wheel, being bent so that the clips resiliently grasp the plow wheel at the bottom of the grooves. The plate is of such diameter that it fits snugly within the cylindrical body and, therefore, the bore in its serves as a support for the shaft 5.

In using the device, the plow is taken out of the chamber, after removal of the cap 3 and the shaft 5. Meanwhile the coloring material is distributed upon the margarine which is to be colored. For instance, if a pound of margarine is to be used, coloring may be distributed roughly over one side face. This mass is now inserted in the chamber; the tangs 10 of the plow wheel are positioned to engage the track 11 and the shaft 5 is inserted through the bore thereof and pressed down through the plastic mass until the end of it seats within the journal 4. The cap 3 is then locked in position and the crank is rotated while the cylinder is held in stationary position. At the outside of the cylinder, brackets 20 and the clamp 21 may be provided for clamping the apparatus on a table top.

As the crank is rotated, for instance in counterclockwise direction, the plow advances the spiral track into and through the mass of margarine until it reaches the opposite end of the container. This passage of the plow through the material effects substantial admixing of the portion of margarine which carries the color material with other portions that are uncolored.

Upon reversal of the direction of rotation of the crank the plow is moved back through the mass of margarine for further distribution of the coloring matter. This procedure is followed for approximately 10 to 15 trips of the plow after which the color is completely and uniformly distributed throughout the body of material; the operation takes approximately one-half minute to a minute. The finished product is then ready for discharge from the container.

When the plastic mass is to be removed, the plow is moved to the other end of the device so that it can be taken out and the presser plate installed in front of it. Then cap 2 is removed and the cap 16 is installed in place of it. Thus, the mass of margarine to be discharged is now located intermediate the presser plate at its one end and the extrusion cap at the other. As the crank is rotated the presser plate pushes the mass toward the cap 16 and the product is extruded out through the opening in the cap, as a continuous strip of predetermined cross section; this can be severed into suitable lengths, for instance, in quarter pound sections. The presser plate removes the main portion of material while the tangs on the plow clear the passageway of the remainder, so that there is little or no waste of colored substance.

The apparatus may be built of any suitable material such as metal, glass or plastic, or combinations of these. Since the structure is of a very simplified nature the device is practically incapable of deteriorating or becoming inoperable.

The invention has been disclosed particularly in relation to an apparatus for coloring one-pound portions of margarine or like substances since it is this type of package which is purchased most frequently by the housewife. However, for restaurants and other purposes a container can be made of substantially larger size if desirable, without impairing the efficiency of the structure.

It will be understood also that while the invention has been disclosed particularly in relation to the coloring of oleomargarine, it is adapted for other purposes where it is desired to homogenize a plastic mass of material.

Having described my invention I claim:

1. A device of the class described comprising a closed cylindrical chamber, a plow member extending generally transversely across the chamber, means for rotating the plow member and means for advancing the plow member from one end of the chamber to the other as it is rotated, the said plow member comprising a piece having a circular contour and being of such diameter that its periphery is spaced only slightly from the internal periphery of the closed cylindrical chamber, with slots extending substantially radially from the periphery of the plow member toward its center, the said slots thereby dividing the member into a plurality of blade segments, each blade segment being on a pitch different from that of said slots and each of the blades containing apertures therein whereby material may pass both through the slots and through the apertures in the blades delineated by the slots, the pitch of the blades of the plow being such that the material passing intermediate the blades is brought into admixing contact with the material passing through the slots as the plow member is rotated.

2. A device of the class described comprising a closed cylindrical chamber, a plow member extending generally transversely across the chamber, means for rotating the plow member and means for advancing the plow member from one end of the chamber to the other as it is rotated, the said plow member comprising a piece having a circular contour and being of such diameter that its periphery is spaced only slightly from the internal periphery of the closed cylindrical chamber, with slots extending substantially radially from the periphery of the plow member toward its center, the said slots thereby dividing the member into a plurality of blade segments, each blade segment being on a pitch different from that of said slots and each of the blades containing apertures therein whereby material may pass both through the slots and through the apertures in the blades delineated by the slots, the said apertures in the blades being of varying diameter, some large and some small.

RICHARD H. JANSSEN.